United States Patent [19]

Oda et al.

[11] Patent Number: 5,065,378
[45] Date of Patent: Nov. 12, 1991

[54] SYSTEM FOR REPRODUCING A SIGNAL RECORDED IN A MAGNETIC RECORDING MEDIUM BY USING A MAGNETOSTATIC WAVE

[75] Inventors: Hitoshi Oda; Takeo Ono, both of Yokohama; Toyoshige Sasaki, Funabashi; Kou Yoneda, Kawasaki; Mamoru Miyawaki, Tokyo, all of Japan

[73] Assignee: Canon Kabushiki Kaisha, Tokyo, Japan

[21] Appl. No.: 604,992

[22] Filed: Oct. 29, 1990

Related U.S. Application Data

[63] Continuation of Ser. No. 291,363, Dec. 30, 1988, abandoned, which is a continuation of Ser. No. 804,111, Dec. 3, 1985, abandoned.

[30] Foreign Application Priority Data

Dec. 12, 1984 [JP] Japan ................................ 59-262253

[51] Int. Cl.$^5$ ................................ G11B 7/00
[52] U.S. Cl. ................................ 369/14; 369/13
[58] Field of Search .................. 350/96.13, 96.14; 365/10, 27, 28, 122, 123; 360/59, 114; 369/13, 14, 112

[56] References Cited

U.S. PATENT DOCUMENTS

| 4,425,023 | 1/1984 | Matsumoto et al. | 369/13 X |
| 4,575,179 | 3/1986 | Lee et al. | 350/96.13 |
| 4,694,358 | 9/1987 | Muchnik et al. | 369/4 |

OTHER PUBLICATIONS

Magnetic Transcription & Magneto-Optic Reproducing Head Using Bi-Substituted Iron Garnet Films; Numata et al.
A New Video Play-Back System Using a Magnetic Garnet Film; Himurd et al.
Narrow Track Readout with Magnetic Garnet Film; Nomura; IEEE Transactions on Magnetics, vol.-Mag.-23; No. 3, May 1987, pp. 1923-1927.
Magneto-Optic Readout of Magnetically Recorded Signal Design Magnetic Garnet Film: Nomura et al.; Trans. IEEE Japan, vol. J67-C p. 871-878 Nov. 1984.
Magnetic Transcription & Magnetic-Optical Reproducing Head Using Bi-Substituted Iron Garnet Films; Numata et al.
Optical Guided-Wave Interactions with Magnetostatic Waves at Micro Wave Frequencies; Fisher et al., App. Phys. Letters 41(9), 1 Nov 1982 pp. 779-781.
Planar Guided-Wave Magnetooptic Pefractions by Magnetostatic Luface Waves in YIG/GG6 Waveguides; Tsai et al. Tech. Digest, pp. TUB 3-1, 1984.
Narrow Track Readout with Magnetic Garnet Film; Nomura, IEEE Transaction on Magnetics. vol. MAG-23 No. 3, May 1987.

*Primary Examiner*—Donald McElheny, Jr.
*Attorney, Agent, or Firm*—Fitzpatrick, Cella, Harper & Scinto

[57] ABSTRACT

A magnetic record reproducing method includes the steps of bringing a magnetic film, capable of producing a magneto static wave, into intimate contact with or proximity to the recording surface of a magnetic recording medium, causing the magnetic film to produce the magnetostatic wave, detecting any variation in wave number in the magnetostatic wave attributable to the magnetized signal of the recording surface, and converting the variation in wave number in the magnetostatic wave into an electrical signal.

7 Claims, 2 Drawing Sheets

SYSTEM FOR REPRODUCING A SIGNAL RECORDED IN A MAGNETIC RECORDING MEDIUM BY USING A MAGNETOSTATIC WAVE

This application is a continuation of prior application, Ser. No. 07/291,363, filed Dec. 30, 1988, which application is a continuation of prior application Ser. No. 06/804,111, filed Dec. 3, 1985, both now abandoned.

BACKGROUND OF THE INVENTION

1. Field of the Invention

This invention relates to a magnetic record reproducing method, and in particular, to a magnetic record reproducing method which is capable of accomplishing high-speed reading.

2. Description of the Prior Art

Heretofore, development of magnetic tapes, magnetic discs, or the like, as memories for recording image information such as animation images and still images obtained by 8 mm VTR, electronic still cameras, or the like, or as the external memories of computers, has been actively carried out. The magnetic record reproducing method of this type generally comprises using a magnetic head such as a ring head, an MR head or a vertical head to detect the direction or density of signal magnetization on a medium and electrically reproducing information.

On the other hand, there has been proposed a magnetic transfer film reproducing method using a magnetic garnet film or the like as a magnetic transfer film to optically reproduce information. The magnetic transfer film reproducing method comprises bringing a magnetic transfer film into intimate contact with a magnetic recording medium, transferring the signal magnetized section of the recording medium to the transfer film by a leakage magnetic field, applying a laser light to the transfer film, and reproducing the transfer film by utilizing the rotation of the plane of polarization of the reflected light caused by the Faraday effect.

FIG. 1 of the accompanying drawings shows the construction of a magnetic head using the transfer film reproducing method according to the prior art. In FIG. 1, reference numeral 1 designates a magnetic recording medium, reference numeral 2 denotes a reflecting film, reference numeral 3 designates a magnetic transfer film, reference numeral 4 denotes a substrate, reference numeral 5 designates a laser light, reference numeral 6 denotes a laser, reference numeral 7 designates a collimator lens, reference numeral 8 denotes a beam splitter, reference numeral 9 designates an analyzer, reference numeral 10 denotes a condensing lens, and reference numeral 11 designates a photodetector. The magnetic transfer film 3 comprising a magnetic garnet film or the like is generally formed on the substrate 4 of GGG or the like by the LPE growing method, and the light reflecting film 2 of Al or the like is provided on top of the magnetic transfer film, and the reflecting film 2 is brought into intimate contact with the magnetic recording medium 1 to thereby transfer a signal magnetized section as the magnetized section of the magnetic transfer film 3. The laser light 5 emitted from the laser 6 is condensed on the magnetic transfer film 3 through the collimator lens 7, the beam splitter 8 and the condensing lens 10, and is subjected to the Faraday rotation corresponding to the signal magnetized section of the magnetic transfer film 3 and is reflected thereby. The reflected light which has detected the signal returns to the original optical path, has its direction of travel changed by the beam splitter 8, is received by the photodetector 11 through the analyzer 9 and the condensing lens 10 and reproduces information.

By thus detecting the signal through the magnetic transfer film, it is possible to eliminate various problems which may arise when reading is effected with the laser light being directly applied to the recording medium, and there is also an advantage that such a method is better in S/N ratio than the signal detecting method by the Kerr rotation used in a magneto-optical disc. However, in the above-described conventional magnetic transfer system, the use of the optical system as shown in FIG. 1 limits the compactness of the apparatus and, to realize a high transfer bit rate, it is necessary to use a plurality of lasers or to divide the laser light into plural lights by a grating or the like and to apply the plural laser lights to plural tracks at the same time. Also, in this case, a photodetector is necessary for each individual laser light beam, and to construct a multitrack reproducing head having ten tracks, ten laser beams and ten photodetectors are necessary, and this leads to a disadvantage that the construction becomes complicated.

SUMMARY OF THE INVENTION

In view of the above-noted disadvantages peculiar to the prior art, it is an object of the present invention to provide a magnetic record reproducing method which is capable of accomplishing high-speed reproduction, such as reproduction of multitrack signals, by an easy and simple method.

To achieve the above object, the magnetic record reproducing method according to the present invention is characterized by the steps of:

bringing a magnetic film capable of producing a magneto-static wave into intimate contact with or proximit to the recording surface of a magnetic recording medium;

causing said magnetic film to produce the magnetostatic wave;

detecting any variation in wave number in the magneto-static wave attributable to the magnetized signal of said recording surface; and converting the variation in wave number in the magneto-static wave into an electrical signal.

DESCRIPTION OF THE PREFERRED EMBODIMENT

The magnetic record reproducing method of the present invention is particularly characterized in that a magnetic film capable of propagating a magneto-static wave therethrough is used as a thin film for transfer of signal magnetization. This magneto-static wave (hereinafter referred to as the MSW) is a magnetic wave by a magnetic moment produced in a magnetic film, like the well-known surface elastic wave, and for example, as a diffraction grating, it can diffract a light waveguided through the magnetic film. This phenomenon will hereinafter be described in detail.

Figure 1:
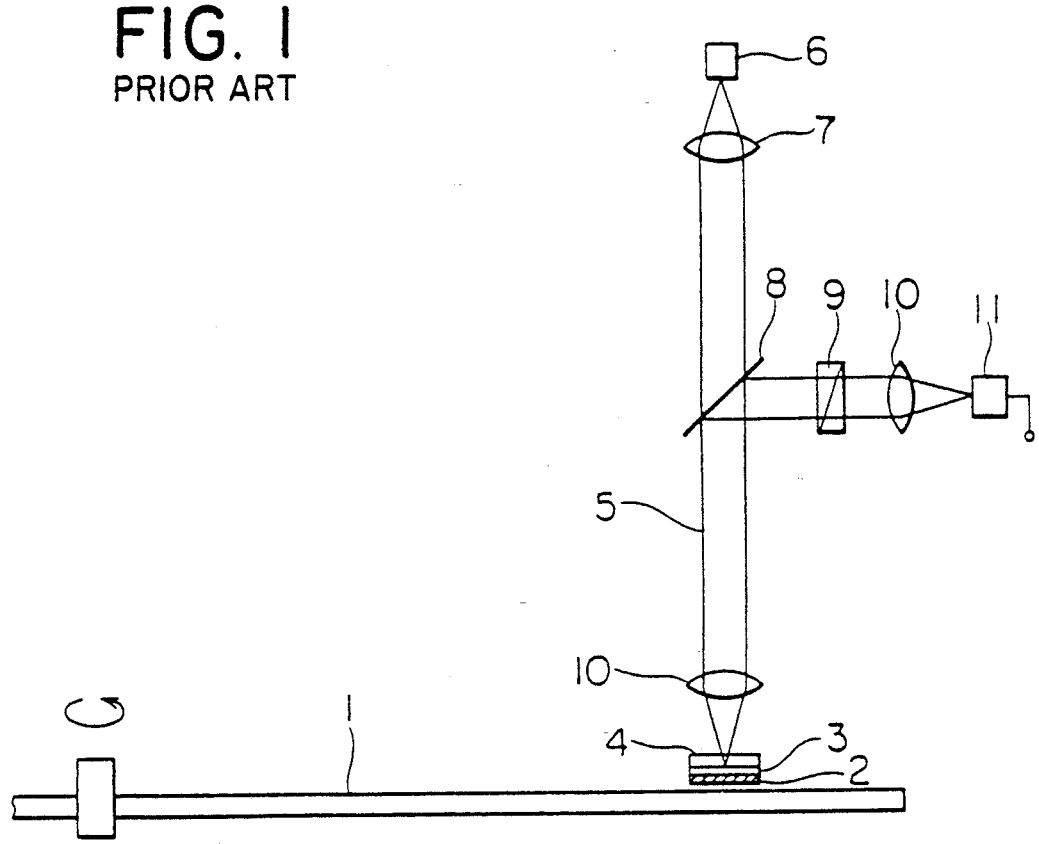
FIG. 1 shows an example of the conventional magnetic head using the transfer film reproducing method.
Figure 2:
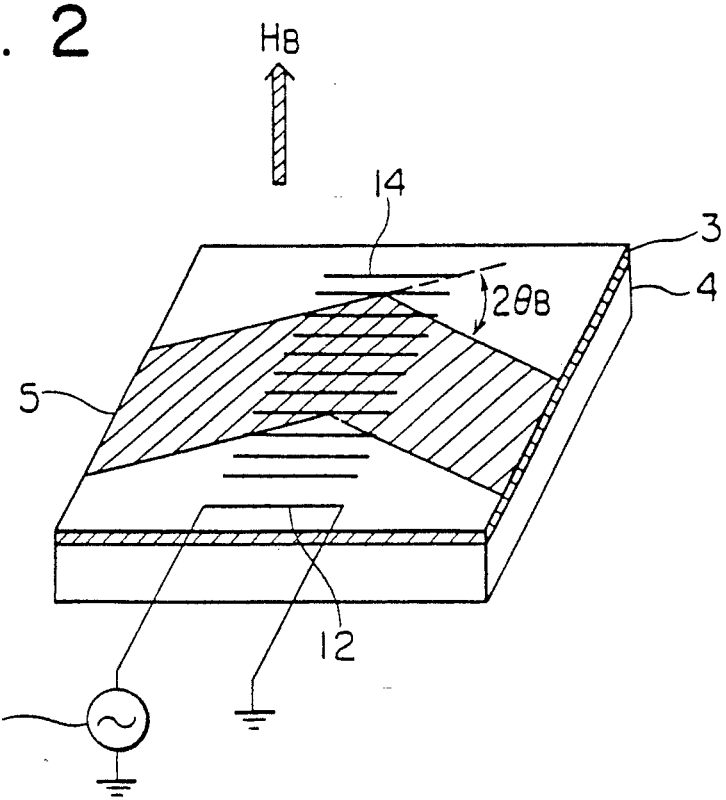
FIG. 2 illustrates the principle of the diffraction of light by a magnet static wave.

Referring to FIG. 2 which illustrates the principle of the diffraction of light by the MSW, reference numeral 12 designates a strip electrode, reference numeral 13 denotes a power source, reference numeral 14 designates the MSW, and members similar to those in FIG. 1 are given similar reference numerals. To a magnetic film 3 provided on a substrate 4, a bias magnetic field $H_B$ is applied in a direction perpendicular to the surface of the film as indicated by the arrow, and all the magnetization in the magnetic film 3 faces in the direction of the arrow. The MSW becomes a volume wave when the bias magnetic field is perpendicular to the surface of the film, and becomes a surface wave when the bias magnetic field is parallel to the surface of the film.

Figure 3:
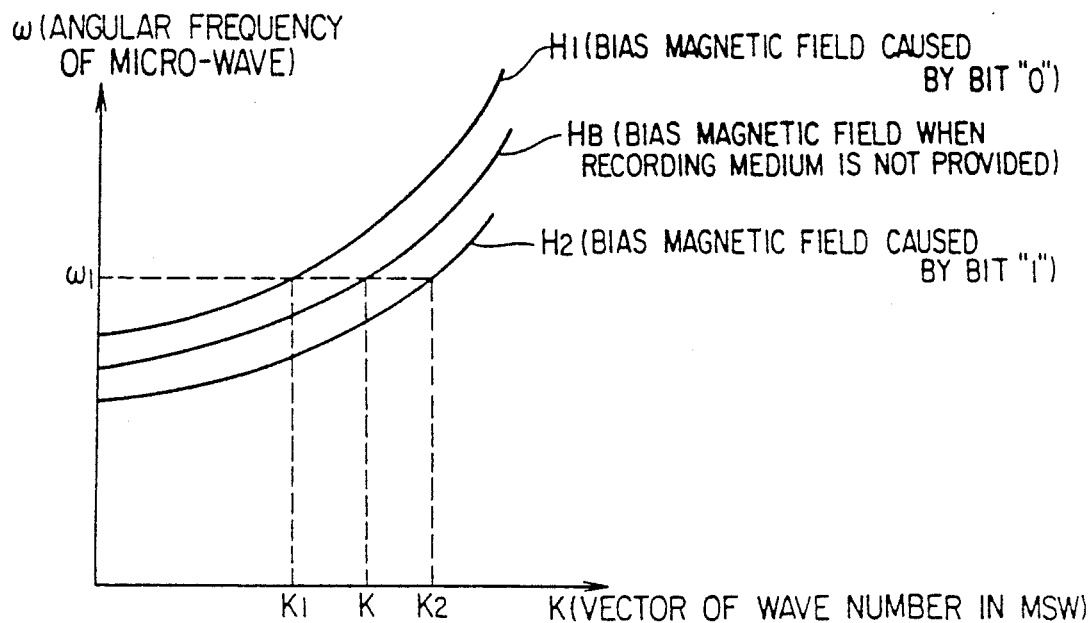
FIG. 3 is a graph showing the relation between a bias magnetic field and the vector of wave number in the magento-static wave.

The strip electrode 12 is provided on the magnetic film 3, and when a microwave (an angular frequency $W_1$) is applied to the strip electrode by the power source 13, K the MSW 14 is propagated through the film. The vector $$K\left(K = \frac{2\pi}{p}\right).$$

where p is the pitch of the grating) of wave number in the MSW 14 is determined by a dispersion curve shown in FIG. 3, and depends on the magnitude of the bias magnetic field $H_B$. When a monochromatic light of wavelength $\lambda$ is waveguided through the magnetic film 3 at this time, the waveguide light beam 5 creates a magneto-optical interaction with the MSW 14 and is subjected to Bragg diffraction. The then Bragg angle $\theta_B$ can be expressed by the following equation:

$$\theta_B = \sin^{-1}\left(\frac{K\lambda}{4\pi}\right)$$

From this equation, it can be seen that the angle of diffraction of the waveguide light beam 5 by the MSW 14 is varied by the vector of wave number in the MSW 14, i.e., the magnitude of the bias magnetic field.

By utilizing the above-described fact that the interaction between the MSW and the waveguide light beam depends on the bias magnetic field, the magnetic record reproducing method of the present invention detects signals from a magnetic recording medium on which information is recorded by in-surface magnetization and vertical magnetization. The principle does not differ, even in a case where the bias magnetic field is applied parallel to the surface of the film and a surface wave is utilized. Also, in order to accurately detect the magnetization signals from the magnetic recording medium, the magnetic film may preferably be brought into intimate contact with the magnetic recording medium or the magnetic head may preferably be provided with a protective film and brought into intimate contact with the magnetic recording medium, whereby the signals may be detected.

An embodiment of the present invention will now be described.

Figure 4:
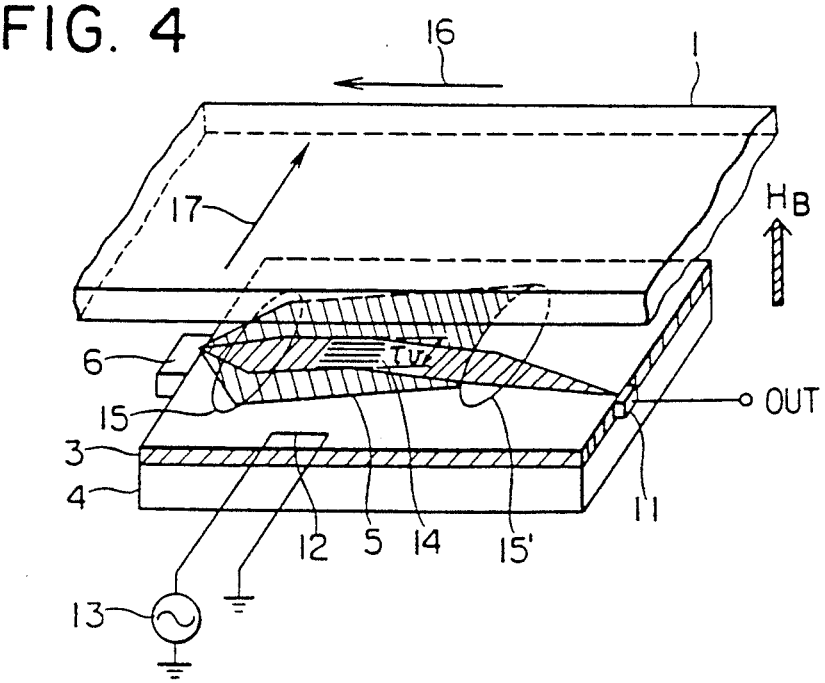
FIG. 4 shows the construction of a magnetic head using the magnetic record reproducing method according to the present invention.

Referring to FIG. 4 which shows a magnetic head for carrying out the magnetic record reproducing method of the present invention, reference numerals 15 and 15' designate thin film lenses such as geodesic lenses, arrow 16 indicates the direction of movement of the magnetic recording medium 1, and arrow 17 indicates the direction of track rows of the magnetic recording medium 1. The magnetic recording medium 1 is a vertical magnetic recording medium and the other reference numerals designate members similar to those in FIGS. 1 and 2. As regards the magnetic head shown in FIG. 4, a magnetic garnet film 3 is formed on a substrate 4 such as GGG, a semiconductor laser 6 and a photodetector 11 are mounted on the opposite end surfaces of the magnetic garnet film 3, and thin film lenses 15, 15' and a strip electrode 12 are provided at predetermined locations on the magnetic garnet film 3. A vertical bias magnetic field $H_B$ is applied to the magnetic garnet film 3 and thus, as previously described, a volume wave is propagated through the magnetic garnet film. The vertical bias magnetic field $H_B$ is set to a value smaller than the coercive force of the magnetic recording medium 1 and never destroys recorded signals. In the present magnetic head having the above-described construction, when a microwave is applied to the strip electrode 12 at a predetermined pulse width for a time $\tau$, a group of MSWs 14 moves through the film at a propagation speed $v$. Accordingly, the length of the group of MSWs is $\tau v$. On the other hand, rows of tracks are recorded on the magnetic recording medium 1 at a track width $\tau v$ in the direction of movement of the MSWs, i.e., in the direction of arrow 17. Digital signals "0" and "1" are recorded on the magnetic recording medium 1 in the present embodiment by the difference in the direction of magnetization of vertical magnetization and thus, two different bias magnetic fields $H_1$ and $H_2$ shown in FIG. 3 are locally applied to the magnetic garnet film 3 which is in intimate contact with the magnetic recording medium 1. Accordingly, when the group of MSWs 14 is propagated along the rows of tracks on the magnetic recording medium 1, the vector of wave number in the MSWs 14 assumes values $K_1$ and $K_2$. At this time, the laser light emitted from the semiconductor laser 6 is made into a parallel light beam by the thin film lens 15 while forming a predetermined angle with respect to the direction of propagation (arrow 17) of the MSWs 14 so as to satisfy the Bragg condition only when the vector of the wave number is $K_1$, and is waveguided through the magnetic garnet film 3. The laser light diffracted by the MSW 14 having the vector of wave number $K_1$ passes through the thin film lens 15' and is received by the photodetector 11. Also, when the MSW 14 has the vector of wave number $K_2$, the Bragg condition is not satisfied and the laser light is not detected by the photodetector 11. Accordingly, a group of MSWs 14 passes under the recording bits of a plurality of tracks on which information is recorded by magnetization, whereby when the MSWs 14 pass under the bit "1", the laser light is Bragg-diffracted and is received by the photodetector, and when the MSWs 14 pass under the bit "0", the Bragg condition is not satisfied and the laser light is not diffracted. By moving the magnetic recording medium 1 while keeping it in intimate contact with the magnetic film comprising the magnetic garnet film 3, it is possible to continuously reproduce the information on a plurality of tracks.

If, in the magnetic record reproducing method according to the present embodiment, the propagation speed $v$ of the MSWs is 10 km/sec. and the pulse width $\tau$ of the microwave is 2 nsec. and the beam width of the laser light is 5 mm, 250 tracks each having a width of 20 μm can be reproduced in 50 μsec.

In the above-described embodiment, there has been shown a case where the laser light is diffracted when the MSW 14 passes through the magnetic section of the signal of bit "1" and the laser light is transmitted when the MSW 14 passes under bit "0", but a case converse to this will become possible by suitably selecting the wavelength of the laser light and the angle of incidence for the MSW 14. Also, signals may be reproduced by detecting the transmitted light instead of detecting the diffracted light.

Also, in the present embodiment, a construction is adopted in which the semiconductor laser and the photodetector are integrally secured to the magnetic film for producing the MSW 14, but it is apparent that detection may be accomplished by causing a light beam to enter from outside through a predetermined optical system or by taking out a light beam to the outside. Further, the MSW may be produced as a standing wave in the magnetic film and a plurality of light beams diffracted by the signal magnetization of individual tracks may be detected, for example, by a plurality of detectors.

Furthermore, in the above-described embodiment of the present invention, optical means has been used to detect a variation in the wave number in the MSW varied by signal magnetization, but besides this, it is possible to provide an MSW detector on the extension in the direction of travel of the MSW travelling in the direction of the track rows, and to calculate the delay time of a plurality of MSWs travelling in the direction of the track rows by a program prepared in advance to thereby reproduce the signals of the individual tracks. In this case, the number of tracks reproduced and the number of MSWs produced are equal to each other.

As described above, the magnetic record reproducing method according to the present invention is a very novel reproducing method in that the wave number in the MSW is varied by a bias magnetic field, and enables high-speed reproduction of magnetic signals by a simple and compact construction. It should be understood that the present invention is not restricted to the above-described embodiment, but covers a variety of methods within the scope of the invention as defined in the appended claims.

What is claimed is:

1. A method of optically reproducing a signal recorded on a magnetic recording medium by using a light beam and a magnetic field including an electrode, the signal having magnetization in one of a first direction and a second direction, opposite to the first direction, said method comprising the steps of:

applying an electric signal to the electrode while applying a bias magnetic field to the magnetic film, thereby producing a magneto-static wave of a predetermined wave number propagating in a propagation direction in the magnetic film;

subjecting the magneto-static wave to the magnetization of the recorded signal, whereby the wave number of the magneto-static wave changes to a first value when the magnetization of the recorded signal is in the first direction and the wave number of the magneto-static wave changes to a second value, different from the first, when the magnetization of the recorded signal is in the second direction;

directing the light beam in a direction to intersect the direction of propagation of the magneto-static wave during said subjecting step, whereby the light beam is directed in a third direction, according to the first value of the wave number, when the magnetization of the recorded signal is in the first direction, and the light beam is directed in a fourth direction, different from the third, according to the second value of the wave number, when the magnetization of the recorded signal is in the second direction;

detecting the direction, from the third and fourth direction, which the light beam is directed in said directing step; and reproducing the recorded signal in accordance with detection of the light beam direction in said detecting step.

2. A method according to claim 1, wherein the electric signal applied in said applying step comprises a microwave signal.

3. A method according to claim 2, wherein said applying step comprises applying the bias magnetic field in a direction perpendicular to a surface of the magnetic film, and wherein said subjecting step comprises subjecting the magneto-static wave to the magnetization substantially perpendicular to the surface of the magnetic film.

4. A method according to claim 2, wherein said applying step comprises applying the bias magnetic field in a direction parallel to the surface of the magnetic film.

5. A method according to claim 2, wherein said directing step comprises a step of propagating the light beam through the magnetic film in a direction parallel to the surface of the magnetic film.

6. An apparatus for optically reproducing a signal recorded on a recording medium, the signal having magnetization in one of a first direction and a second direction, opposite to the first direction, the first and second directions being orthogonal to the recording medium, said apparatus comprising:

a substrate;

a magnetic film formed on said substrate;

a strip electrode provided on said substrate;

a microwave generator for applying a microwave to the electrode, while applying a bias magnetic field to the magnetic film in a direction perpendicular to a surface of the magnetic film, to propagate a magneto-static wave of a predetermined wave number in a propagation direction in the magnetic film, whereby the wave number of the magneto-static wave changes to a first value when the magnetization of the recorded signal is in the first direction and the wave number of the magneto-static wave changes to a second value, different from the first, when the magnetization of the recorded signal is in the second direction;

light beam directing means for directing a light beam in a direction to intersect the direction of propagation of the magneto-static wave, whereby the light beam is irradiated in a third direction, according to the first value of the wave number, when the magnetization of the recorded signal is in the first direction, and the light beam is directed in a fourth direction, different from the third, according to the second value of the wave number, when the magnetization of the recorded signal is in the second direction; and a photodetector for receiving and photoelectrically sensing the light beam directed in the third direction, and not the light beam directed in the fourth direction, to output an electric signal for reproduction of the recorded signal.

7. An apparatus according to claim 6, wherein said light beam directing means comprises means for propagating the light beam through the magnetic film in a direction parallel to the surface of the magnetic film.

* * * * *

UNITED STATES PATENT AND TRADEMARK OFFICE
CERTIFICATE OF CORRECTION

PATENT NO. : 5,065,378

DATED : November 12, 1991

INVENTOR(S) : Hitoshi Oda, et al.

Page 1 of 3

It is certified that error appears in the above-identified patent and that said Letters Patent is hereby corrected as shown below:

Title page:

IN THE REFERENCES CITED

OTHER PUBLICATIONS

"A New Video Play Back System Using a Magnetic Garnet Film; Himurd, et al." should read --A New Video Play Back System Using a Magnetic Garnet Film; Himuro, et al.--;

"Magneto-Optic Readout of Magnetically Recorded Signal Design Magnetic Garnet Film; Nomura, et al;" should read --Magneto-Optic Readout of Magnetically Recorded Signal Using Magnetic Garnet Film; Nomura, et al.;--; and "Planar Guided-Wave Magnetooptic Pefractions by Magnetostatic Luface Waves in YIG/GG6 Wave-" should read --Planar Guided-Wave Magnetooptic Refraction by Magnetostatic Surface Waves in YIG/GGG Wave- --.

IN THE ABSTRACT

Line 3, "magneto static" should read --magnetostatic--.

UNITED STATES PATENT AND TRADEMARK OFFICE
CERTIFICATE OF CORRECTION

PATENT NO. : 5,065,378

DATED : November 12, 1991

INVENTOR(S) : Hitoshi Oda, et al.

It is certified that error appears in the above-identified patent and that said Letters Patent is hereby corrected as shown below:

COLUMN 2

Line 36, "proximit" should read --proximate--;
Line 51, "magnet static" should read --magnetostatic--.

COLUMN 3

Line 21, "K" should be deleted.

COLUMN 4

Line 29, "signals $\mp$0" and $\mp$1" " should read --signals "0" and "1"--.

UNITED STATES PATENT AND TRADEMARK OFFICE
CERTIFICATE OF CORRECTION

PATENT NO. : 5,065,378

DATED : November 12, 1991

INVENTOR(S) : Hitoshi Oda, et al.

It is certified that error appears in the above-identified patent and that said Letters Patent is hereby corrected as shown below:

Column 6, line 61, "irradiated" should read --directed--.

Signed and Sealed this

Twenty-third Day of March, 1993

Attest:

STEPHEN G. KUNIN

*Attesting Officer*     Acting Commissioner of Patents and Trademarks